United States Patent
Jung et al.

(10) Patent No.: US 10,549,595 B2
(45) Date of Patent: Feb. 4, 2020

(54) STRUT ASSEMBLY FOR VEHICLE

(71) Applicants: Hyundai Motor Company, Seoul (KR); Kia Motors Corporation, Seoul (KR)

(72) Inventors: Se-Woong Jung, Seoul (KR); In-Seb Choi, Hwaseong-si (KR); Ji-Won Chang, Yongin-si (KR); Yun-Bae Chun, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 186 days.

(21) Appl. No.: 15/809,257

(22) Filed: Nov. 10, 2017

(65) Prior Publication Data

US 2018/0170138 A1  Jun. 21, 2018

(30) Foreign Application Priority Data

Dec. 15, 2016 (KR) .......................... 10-2016-0171424

(51) Int. Cl.
*B62D 25/08* (2006.01)
*B60G 13/00* (2006.01)
*B60G 15/06* (2006.01)

(52) U.S. Cl.
CPC ......... *B60G 13/003* (2013.01); *B60G 15/067* (2013.01); *B62D 25/088* (2013.01); *B60G 2204/128* (2013.01)

(58) Field of Classification Search
CPC ............ B62D 25/088; B60G 2204/128; B60G 13/003; B60G 15/067; B60G 15/068

USPC .................................... 280/124.147, 124.155
See application file for complete search history.

(56) References Cited

U.S. PATENT DOCUMENTS

| | | | | |
|---|---|---|---|---|
| 5,211,380 A | * | 5/1993 | Germano | B60G 15/068 267/220 |
| 5,375,870 A | * | 12/1994 | Smith | B60G 11/16 180/297 |
| 9,662,953 B2 | * | 5/2017 | Murakami | B60G 15/068 |
| 2014/0049019 A1 | * | 2/2014 | Ahn | B62D 21/09 280/124.155 |
| 2016/0129747 A1 | * | 5/2016 | Mildner | B62D 25/088 280/124.155 |
| 2017/0080983 A1 | * | 3/2017 | Kowaki | B60G 15/067 |

FOREIGN PATENT DOCUMENTS

KR  10-2014-0024655 A  3/2014

* cited by examiner

*Primary Examiner* — Ruth Ilan
(74) *Attorney, Agent, or Firm* — Morgan, Lewis & Bockius LLP

(57) ABSTRACT

A strut assembly for a vehicle may include a shock absorber housing cover, into which a strut is inserted, and which is mounted, along with the strut, to a vehicle body, a shock absorber mounting panel configured to cover an upper portion of the shock absorber housing cover, and mounted to the vehicle body, and a coupling bolt inserted upward into a bolt coupling hole formed in the shock absorber housing cover, wherein the shock absorber mounting panel includes a contact surface portion having a cross-sectional area less than a cross-sectional area of a nut coupled with the coupling bolt, the contact surface portion having a hole corresponding to the bolt coupling hole, and the shock absorber mounting panel is brought into contact with the shock absorber housing cover by the contact surface portion.

4 Claims, 7 Drawing Sheets

STRUT ASSEMBLY FOR VEHICLE

CROSS-REFERENCE(S) TO RELATED APPLICATIONS

The present application claims priority to Korean Patent Application No. 10-2016-0171424 filed Dec. 15, 2016, the entire contents of which is incorporated herein for all purposes by this reference.

BACKGROUND OF THE INVENTION

Field of the Invention

The present invention relates to a strut assembly configured for mitigating a shock applied to an axle of a vehicle, and a shock absorber mounting panel including the same.

Description of Related Art

Suspension systems for vehicles couple a vehicle body with an axle and prevent vibration or shock from being directly transmitted from a road surface to the vehicle body when a vehicle travels, thus preventing the vehicle or cargo from being damaged, and improving riding comfort.

The suspension systems are classified into various types according to a method in coupling with a vehicle body or a vibration control method. Furthermore, front suspension systems, which are classified into several types according to a style of front axle, are configured to couple a frame with the axle, thus supporting the weight of the vehicle, and absorbing vibrations generated from vehicle wheels. In addition, a portion of a steering apparatus of the vehicle is disposed on a front suspension system.

For this, the suspension system includes a spring, a strut and so on. Referring to FIG. 1, in a strut structure provided with a shock absorber, a lower portion of the strut is coupled to the vehicle wheels by a suspension arm, and an upper portion thereof has a shape in which it partially protrudes through a hole formed in the shock absorber housing cover 3.

Installation of the strut structure is embodied as follows. A hole for bolt coupling is formed in the shock absorber housing cover 3. A shock absorber mounting panel 4 is placed on and coupled with the shock absorber housing cover 3 by a bolt 2 protruding upward through the hole of the shock absorber housing cover 3.

As shown in the drawing, the shock absorber mounting panel 4 is formed in a predetermined shape through a partial forming process and is brought into contact with and coupled with the shock absorber housing cover 3.

However, there is a problem in that, as a load is continuously applied to the shock absorber mounting panel 4 having the above-mentioned coupling structure, the panel itself and the vehicle body may be continuously deformed.

Furthermore, there is a problem in that an insulator that corresponds to an upper portion of the strut, which is used to mount the strut to the vehicle body, is also deformed.

In an effort to overcome the above-mentioned problems, provided was a structure using a reinforcing member placed on the shock absorber mounting panel 4 at the partial-forming position to improve the structure of the shock absorber mounting panel 4. However, such an additional reinforcing member increases the cost of materials, and nevertheless there is still a problem of insufficient strength.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a strut assembly and a shock absorber mounting panel for a vehicle which are configured such that an input load applied to the shock absorber mounting panel is mitigated whereby the stiffness of the panel and the vehicle body can be improved.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with various exemplary embodiments of the present invention, there is provided a strut assembly for a vehicle, including: a shock absorber housing cover, into which a strut is inserted, and which is mounted, along with the strut, to a vehicle body; a shock absorber mounting panel configured to cover an upper portion of the shock absorber housing cover, and mounted to the vehicle body; and a coupling bolt inserted upward into a bolt coupling hole formed in the shock absorber housing cover, wherein the shock absorber mounting panel includes a contact surface portion having a cross-sectional area less than a cross-sectional area of a nut coupled with the coupling bolt, the contact surface portion having a hole corresponding to the bolt coupling hole, and the shock absorber mounting panel is brought into contact with the shock absorber housing cover by the contact surface portion.

The nut may be coupled with the coupling bolt at a position distanced from the contact surface portion of the shock absorber mounting panel.

The shock absorber mounting panel may include a flat surface portion distanced from the contact surface portion, the flat surface portion being brought into contact with the nut.

The shock absorber mounting panel may include a spacing surface portion coupling the contact surface portion with the flat surface portion, the spacing surface portion being distanced from the coupling bolt.

The strut may be a front strut mounted between the vehicle body and a front wheel.

In accordance with various exemplary embodiments of the present invention, there is provided a strut assembly for a vehicle, including: a shock absorber housing, into which a strut is inserted, and which is mounted, along with the strut, to a vehicle body; a shock absorber mounting panel configured to cover an upper portion of the shock absorber housing cover, and mounted to the vehicle body; and a coupling bolt inserted upward into a bolt coupling hole formed in the shock absorber housing cover, wherein the shock absorber mounting panel includes a flat surface portion having a hole corresponding to the bolt coupling hole, the flat surface portion being distanced from the shock absorber housing cover.

A nut coupled to the coupling bolt comes into contact with the flat surface portion.

The shock absorber mounting panel may include a central stepped portion extending from the flat surface portion toward an upper end portion of the strut in a stepped shape.

The strut may be a front strut mounted between the vehicle body and a front wheel.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
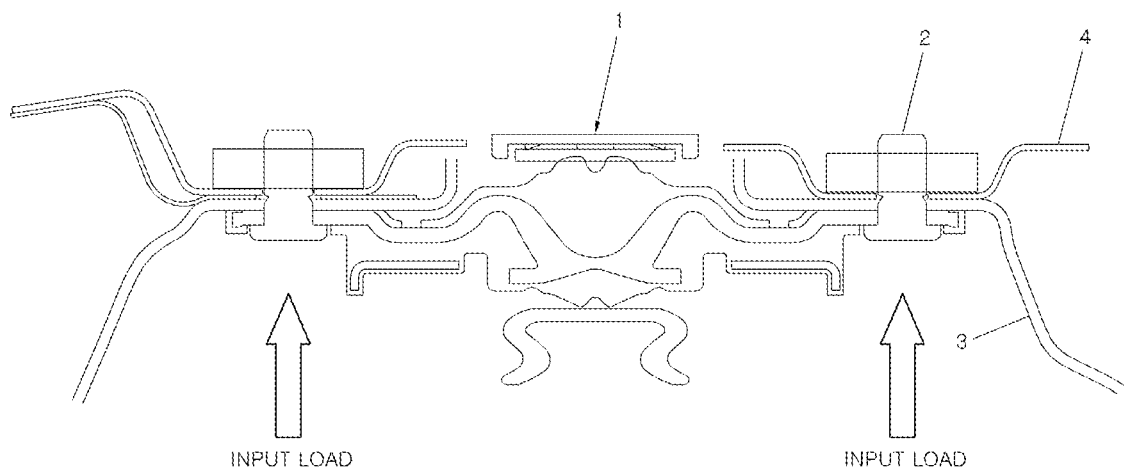
FIG. 1 is a view illustrating the configuration of a typical strut assembly.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described below in more detail with reference to the accompanying drawings to be easily realized by those skilled in the art.

The present invention may, however, be embodied in different forms and may not be construed as limited to the embodiments set forth herein. In certain embodiments, irrelevant to the present invention may be omitted to avoid obscuring appreciation of the disclosure. Throughout the disclosure, like reference numerals refer to like parts throughout the various figures and embodiments of the present invention.

The drawings are not necessarily to scale and in some instances, proportions may have been exaggerated to clearly illustrate various layers and regions of the embodiments. It will be understood that when an element including a layer, a film, a region, or a plate is referred to as being "above" another element, it can be "immediately above" the other element or intervening elements may also be present.

In contrast, when an element is referred to as being "immediately above" another element, there are no intervening elements present. In addition, it will be understood that when an element is referred to as being "entirely" formed on another element, it can be formed on the entire surface (or whole surface) of the other element or cannot be formed at a portion of the edge portion thereof.

Figure 2:
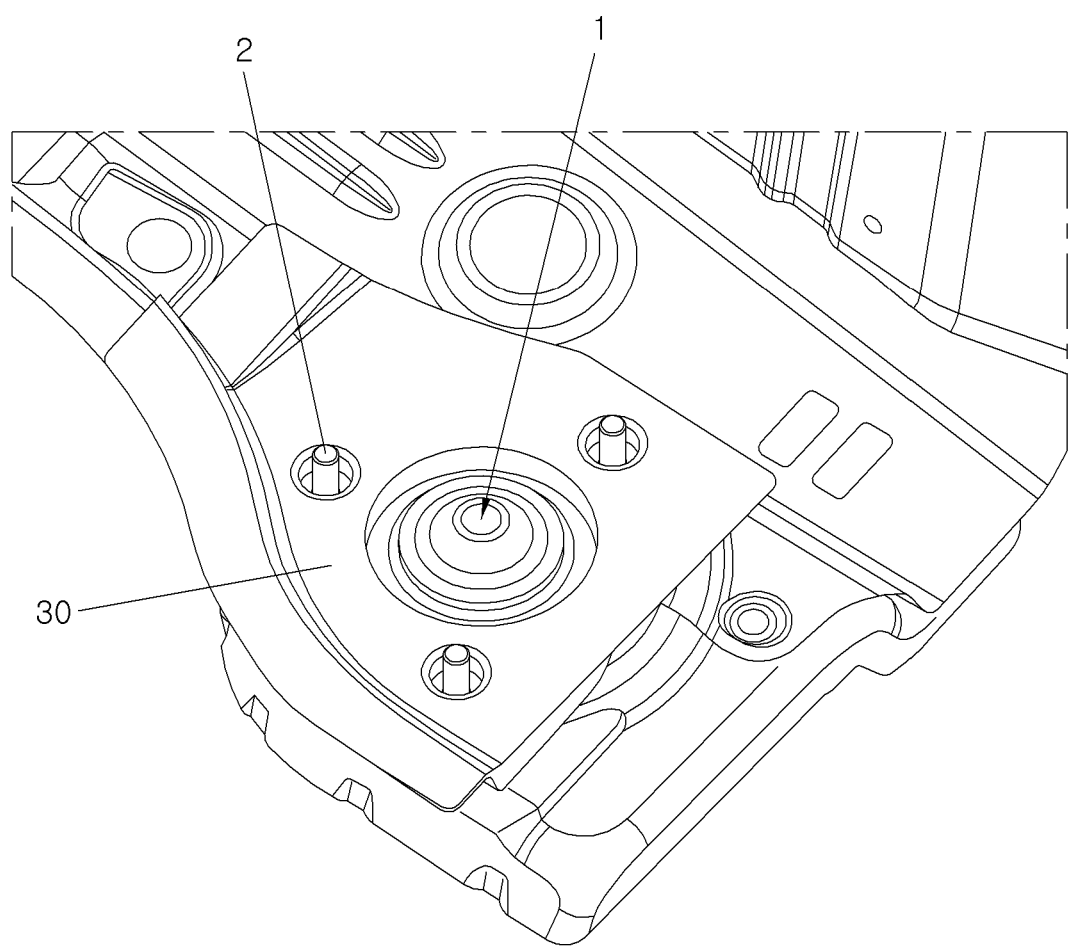
FIG. 2 is a view illustrating a strut assembly according to an exemplary embodiment of the present invention.
Figure 3:
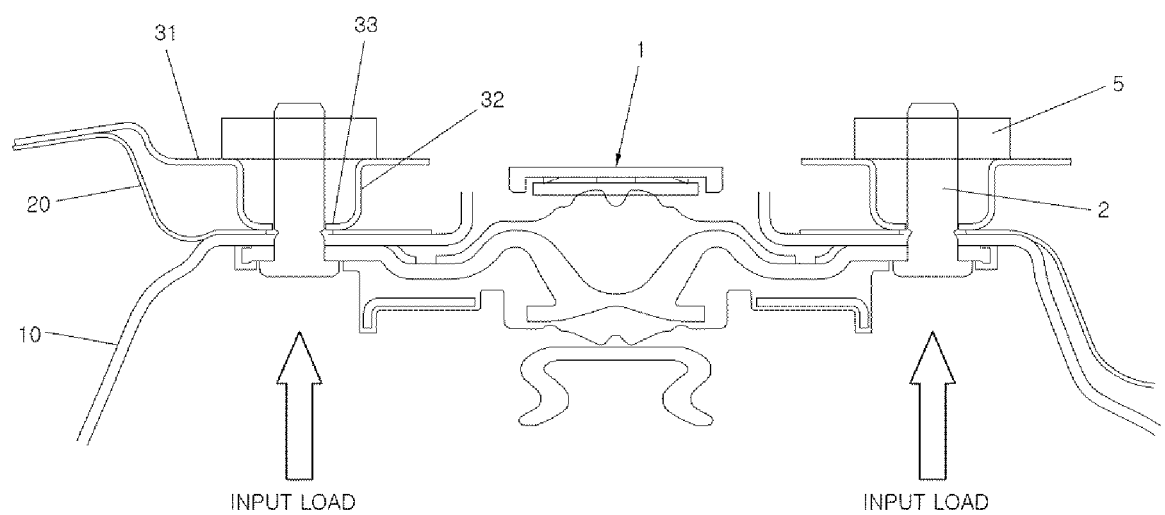
FIG. 3 is a sectional view illustrating the strut assembly of FIG. 2.

FIG. 2 is a view illustrating a strut assembly according to an exemplary embodiment of the present invention. FIG. 3 is a sectional view illustrating the strut assembly of FIG. 2.

Hereinafter, a strut assembly and a shock absorber mounting panel according to an exemplary embodiment of the present invention will be described with reference to FIG. 2 and FIG. 3.

The strut assembly according to an exemplary embodiment of the present invention includes changing the shape of the shock absorber mounting panel to solve a problem of permanent deformation of the shock absorber mounting panel and the vehicle body due to an input load applied thereto.

The conventional shock absorber mounting panel has a central insertion hole, into which the strut is inserted, and is coupled, by a coupling bolt 2, to a shock absorber housing cover 10 mounted to the vehicle body including a cowl 20 or the like. Thus, a large amount of vertical load is applied to the shock absorber mounting panel.

To overcome the conventional problem, a shock absorber mounting panel 30 that is covered with a shock absorber housing cover 10 and mounted to the vehicle body has a central hole corresponding to the central insertion hole of the shock absorber housing cover 10 and is formed of a flat surface portion 31, a spacing surface portion 32 and a contact surface portion 33.

The flat surface portion 31 extends from the central hole to have a generally flat structure other than portions for bolt insertion and nut coupling. The flat surface portion 31 is vertically distanced from the shock absorber housing cover 10 and the cowl 20 corresponding to the vehicle body.

The contact surface portion 33 that has a hole corresponding to a bolt coupling hole formed in the shock absorber housing cover is formed such that a cross-sectional area of the contact surface portion 33 is less than a cross-sectional area of a nut 5 to be coupled with a coupling bolt 2.

Due to the structure of the contact surface portion 33, the nut 5 is brought into contact with only the flat surface portion 31 distanced from the contact surface portion 33 when the nut 5 is coupled with the shock absorber mounting panel 30. Accordingly, the area with which the shock absorber mounting panel 30 comes into contact with the cowl 20 may be minimized.

Furthermore, the spacing surface portion 32 is also distanced from the coupling bolt 2 that is inserted thereinto. Thanks to the present structure, a shock resulting from the input load can be mitigated and easily absorbed.

Three or more coupling bolts 2 are provided. The flat surface portion, the spacing surface portion and the contact surface portion of the shock absorber mounting panel are formed at each of positions corresponding to the respective bolt coupling holes.

Figure 4:
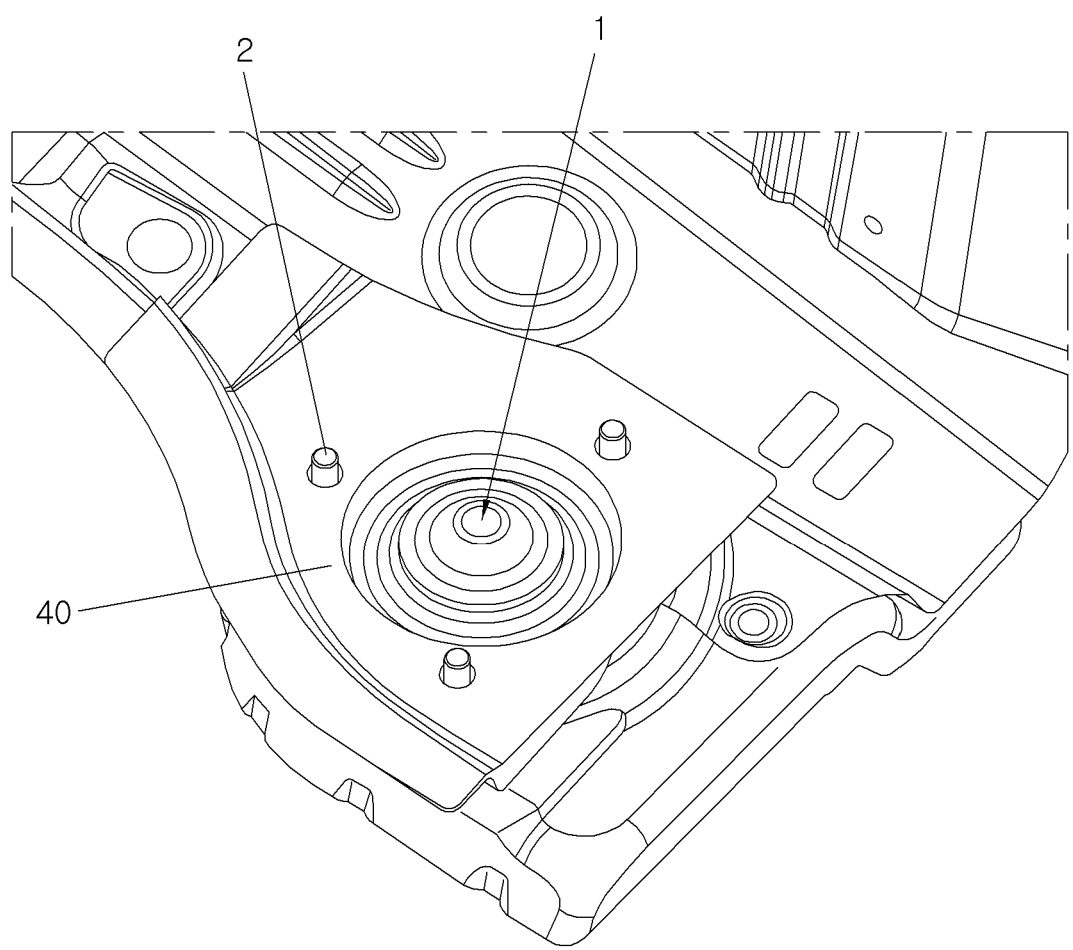
FIG. 4 is a view illustrating a strut assembly according to another exemplary embodiment of the present invention.
Figure 5:
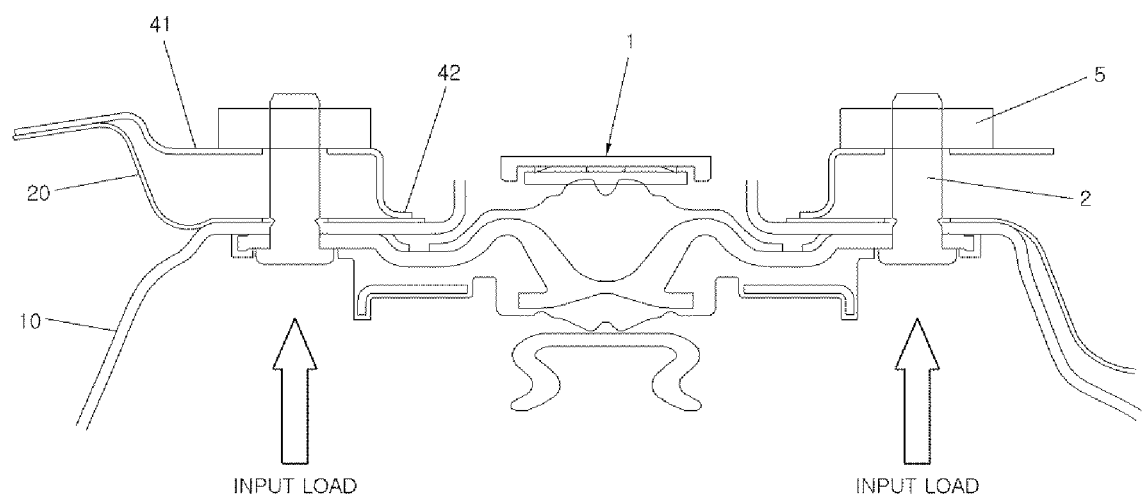
FIG. 5 is a sectional view illustrating the strut assembly of FIG. 4.

FIG. 4 is a view illustrating a strut assembly according to another exemplary embodiment of the present invention. FIG. 5 is a sectional view illustrating the strut assembly of FIG. 4.

Hereinafter, a strut assembly and a shock absorber mounting panel according to the exemplary embodiment of the present invention will be described with reference to FIG. 4 and FIG. 5.

The strut assembly and the shock absorber mounting panel according to the present embodiment can also minimize a vertical load applied to the shock absorber mounting panel for the same purpose as that of the foregoing embodiment.

The shock absorber mounting panel 40 has a central hole corresponding to a central insertion hole of the shock absorber housing cover 10 and is formed of a flat surface portion 41 and a central stepped portion 42.

The flat surface portion 41 has a hole corresponding to a bolt coupling hole of the shock absorber housing cover 10 and has a generally flat shape. The flat surface portion 41 is distanced from the shock absorber housing cover 10.

In the present embodiment, the flat surface portion 41 of the shock absorber mounting panel 40 has the above-mentioned configuration, so that the nut 5 comes into contact with the flat surface portion 41 when it is coupled with to the shock absorber mounting panel 40, whereby the area with which the shock absorber mounting panel 40 makes contact with the cowl 20 can be minimized.

Furthermore, the central stepped portion 42 is formed in a stepped shape extending from the flat surface portion 41 toward the central hole corresponding to the central insertion hole and is supported on the shock absorber housing cover 10.

Thanks to the present structure, a shock resulting from the input load applied to the shock absorber mounting panel 40 can be mitigated and easily absorbed.

Three or more coupling bolts 2 are provided. The flat surface portion and the central stepped portion of the shock absorber mounting panel are formed at each of positions corresponding to the respective bolt coupling holes.

Accordingly, a separate surface (a seating surface) which is seated on the vehicle body is removed, and the entire surface is matched with the strut mounting portion. Therefore, compared to the conventional technique, a shock resulting from the input load can be mitigated, whereby deformation of the vehicle body can be minimized.

Figure 6:
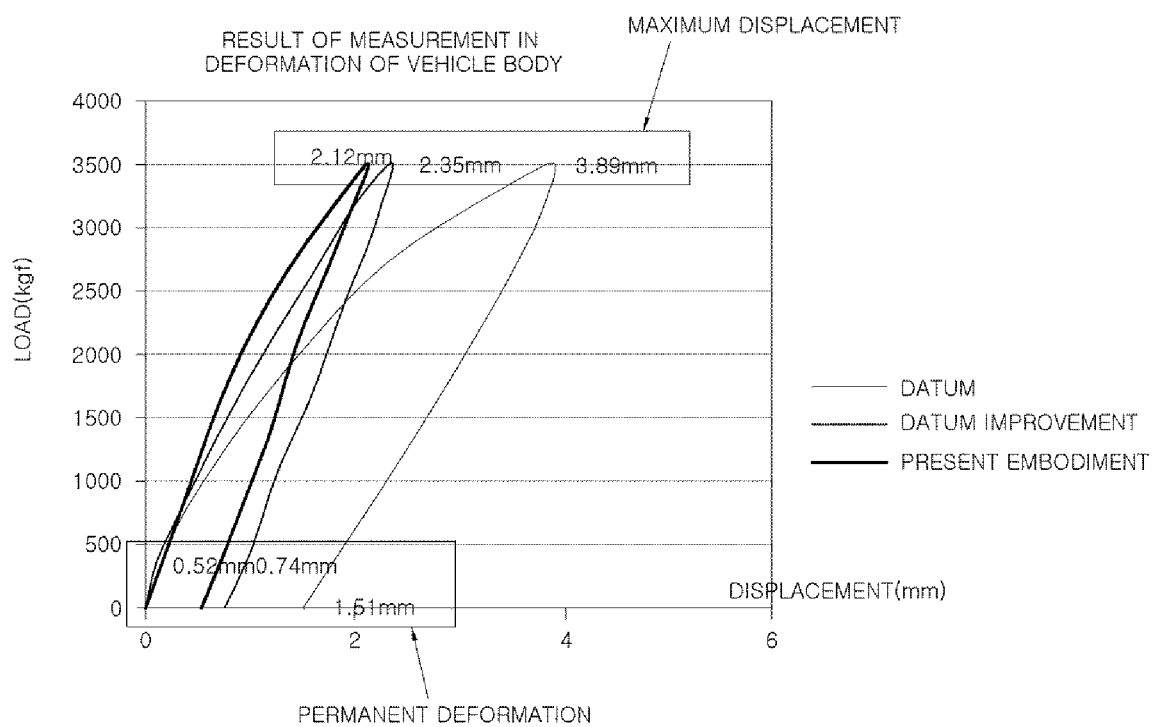
FIG. 6 and FIG. 7 illustrate the result of measurement in the amount of deformation of a vehicle body by the strut assembly according to an exemplary embodiment of the present invention.
Figure 7:
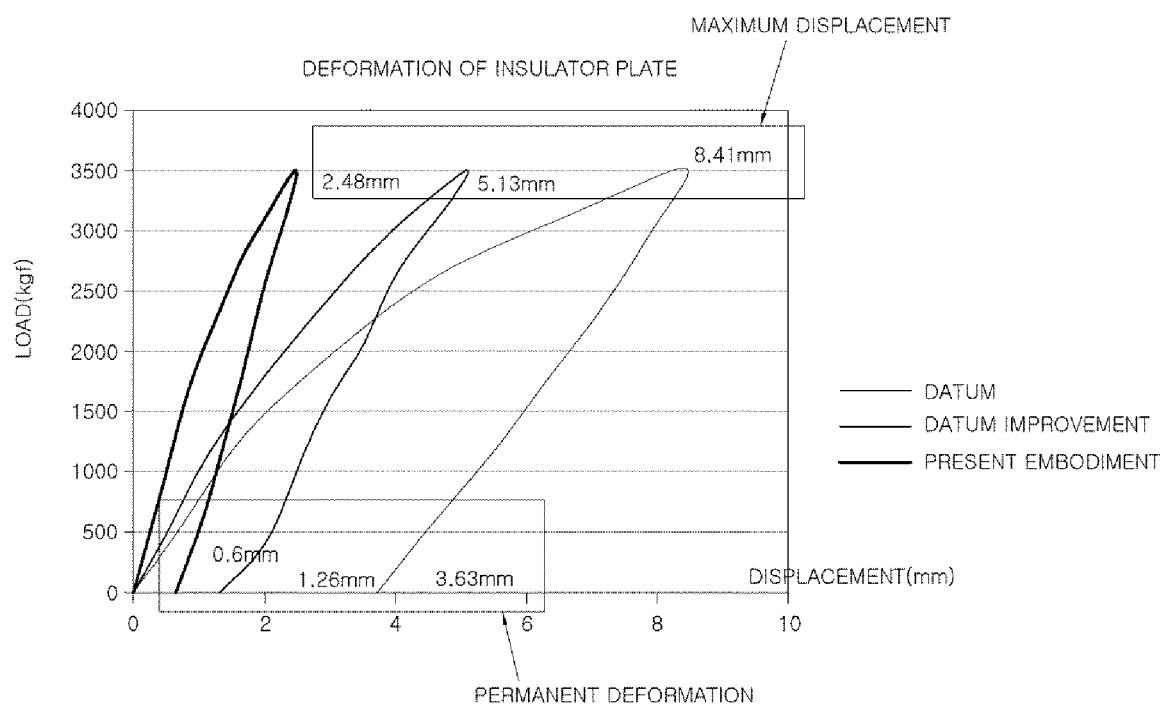

FIG. 6 and FIG. 7 illustrate the result of measurement in the amount of deformation of the vehicle body. As shown in FIG. 6 and FIG. 7, it can be interpreted that the strut assembly and the shock absorber mounting panel according to an exemplary embodiment of the present invention can minimize a displacement with respect to the input load, unlike the two conventional comparative examples.

As can be understood from the above-described embodiments, the shock absorber mounting panel and the strut assembly including the same according to an exemplary embodiment of the present invention can buffer and absorb an input load transmitted from a shock absorber housing cover, whereby the rate at which the load is transmitted not to the panel but also to the vehicle body can be minimized. Consequently, the stiffness of the panel and the vehicle body can be effectively maintained.

As described above, according to a strut assembly and a shock absorber mounting panel for a vehicle In accordance with various aspects of the present invention, the shape of the shock absorber mounting panel is improved so that the stiffness of the shock absorber mounting panel with respect to a load can be enhanced, whereby the amount of permanent deformation of related parts can be reduced, the lifespan of the parts can be increased, and the production cost can be reduced.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A strut assembly for a vehicle; the strut assembly comprising:
    a shock absorber housing cover, into which a strut is inserted, and which is mounted, along with the strut, to a vehicle body;
    a shock absorber mounting panel configured to cover an upper portion of the shock absorber housing cover, and mounted to the vehicle body; and
    a coupling bolt inserted upward into a bolt coupling hole formed in the shock absorber housing cover,
    wherein the shock absorber mounting panel includes a contact surface portion having a cross-sectional area less than a cross-sectional area of a nut coupled with the coupling bolt,
    the contact surface portion having a hole corresponding to the bolt coupling hole, and the shock absorber mounting panel is brought into contact with the shock absorber housing cover by the contact surface portion, and
    wherein the shock absorber mounting panel includes a flat surface portion formed to be distanced from the contact surface portion, the flat surface portion contacting with the nut.

2. The strut assembly of claim 1, wherein the nut is coupled with the coupling bolt at a position distanced from the contact surface portion of the shock absorber mounting panel.

3. The strut assembly of claim 1, wherein the shock absorber mounting panel includes a spacing surface portion coupling the contact surface portion with the flat surface portion, the spacing surface portion being distanced from the coupling bolt.

4. The strut assembly of claim 3, wherein the strut includes is a front strut mounted between the vehicle body and a front wheel.

\* \* \* \* \*